United States Patent
McCauley et al.

(10) Patent No.: US 10,370,460 B1
(45) Date of Patent: Aug. 6, 2019

(54) PROCESS FOR PRODUCING FUNCTIONALIZED POLYMERS

(71) Applicant: BRIDGESTONE CORPORATION, Tokyo (JP)

(72) Inventors: Kevin Michael McCauley, Akron, OH (US); Timothy Leonard Tartamella, Silver Lake, OH (US); Zachary Aaron Bush, Mogadore, OH (US)

(73) Assignee: Bridgestone Corporation, Tokyo (JP)

( * ) Notice: Subject to any disclaimer, the term of this patent is extended or adjusted under 35 U.S.C. 154(b) by 373 days.

(21) Appl. No.: 15/159,114

(22) Filed: May 19, 2016

Related U.S. Application Data

(60) Provisional application No. 62/164,171, filed on May 20, 2015.

(51) Int. Cl.
| | |
|---|---|
| C08C 19/22 | (2006.01) |
| C08C 19/44 | (2006.01) |
| C08F 2/38 | (2006.01) |
| C08F 8/30 | (2006.01) |
| C08K 5/16 | (2006.01) |
| C08K 5/34 | (2006.01) |
| C08F 4/52 | (2006.01) |
| C08F 4/54 | (2006.01) |
| C08F 36/04 | (2006.01) |

(52) U.S. Cl.
CPC .............. *C08C 19/22* (2013.01); *C08C 19/44* (2013.01); *C08F 2/38* (2013.01); *C08F 8/30* (2013.01); *C08F 4/52* (2013.01); *C08F 4/545* (2013.01); *C08F 36/04* (2013.01); *C08K 5/16* (2013.01); *C08K 5/34* (2013.01)

(58) Field of Classification Search
CPC .... C08F 8/30; C08F 36/04; C08F 4/52; C08F 4/545; C08F 2/38; C08C 19/22; C08C 19/44; C08K 5/16; C08K 5/34
See application file for complete search history.

(56) References Cited

U.S. PATENT DOCUMENTS

| | | |
|---|---|---|
| 3,842,111 A | 10/1974 | Meyer-Simon et al. |
| 3,873,489 A | 3/1975 | Thurn et al. |
| 3,978,103 A | 8/1976 | Meyer-Simon et al. |
| 3,997,581 A | 12/1976 | Pletka et al. |
| 4,002,594 A | 1/1977 | Fetterman |
| 4,906,706 A | 3/1990 | Hattori et al. |
| 4,990,573 A | 2/1991 | Andreussi et al. |
| 5,064,910 A | 11/1991 | Hattori et al. |
| 5,227,425 A | 7/1993 | Rauline |
| 5,567,784 A | 10/1996 | Wieder et al. |
| 5,580,919 A | 12/1996 | Agostini et al. |
| 5,583,245 A | 12/1996 | Parker et al. |
| 5,663,396 A | 9/1997 | Musleve et al. |
| 5,674,932 A | 10/1997 | Agostini et al. |
| 5,684,171 A | 11/1997 | Wideman et al. |
| 5,684,172 A | 11/1997 | Wideman et al. |
| 5,696,197 A | 12/1997 | Smith et al. |
| 5,717,022 A | 2/1998 | Beckmann et al. |
| 5,719,207 A | 2/1998 | Cohen et al. |
| 5,844,050 A | 12/1998 | Fukahori et al. |
| 5,876,527 A | 3/1999 | Tsuruta et al. |
| 5,931,211 A | 8/1999 | Tamura |
| 5,971,046 A | 10/1999 | Koch et al. |
| 6,342,552 B1 | 1/2002 | Hergenrother et al. |
| 6,525,118 B2 | 2/2003 | Hergenrother |
| 6,579,949 B1 | 6/2003 | Hergenrother et al. |
| 6,590,017 B1 | 7/2003 | Hergenrother et al. |
| 6,608,145 B1 | 8/2003 | Lin et al. |
| 6,667,362 B2 | 12/2003 | Robert et al. |
| 6,683,135 B2 | 1/2004 | Cruse et al. |
| 6,699,813 B2 | 3/2004 | Luo et al. |
| 6,838,526 B1 | 1/2005 | Sone et al. |
| 6,977,281 B1 | 12/2005 | Ozawa et al. |
| 6,992,147 B1 | 1/2006 | Ozawa et al. |
| 7,351,776 B2 | 4/2008 | Tartamella et al. |
| 7,671,138 B2 | 3/2010 | Luo |
| 7,732,534 B2 | 6/2010 | Luo et al. |
| 7,825,201 B2 | 11/2010 | Luo et al. |
| 7,879,952 B2 | 2/2011 | Luo et al. |
| 7,879,958 B2 | 2/2011 | Luo et al. |
| 8,088,868 B2 | 1/2012 | Luo et al. |
| 8,314,189 B2 | 11/2012 | Luo et al. |
| 8,623,975 B2 | 1/2014 | Luo et al. |
| 2004/0147694 A1 | 7/2004 | Sone et al. |
| 2006/0004131 A1 | 1/2006 | Ozawa et al. |

(Continued)

FOREIGN PATENT DOCUMENTS

| | | |
|---|---|---|
| JP | 05-051406 A | 3/1993 |
| JP | 05-059103 A | 3/1993 |

(Continued)

*Primary Examiner* — Roberto Rabago
(74) *Attorney, Agent, or Firm* — Meredith E. Hooker; Arthur M. Reginelli

(57) ABSTRACT

A method for producing a functionalized polymer, the method comprising the steps of: (i) preparing a bulk polymerization system including a reactive polymer by introducing a lanthanide-based catalyst and a conjugated diene monomer; (ii) adding a heterocyclic nitrile compound the polymerization system including the reactive polymer to prepare polymerization system including a functionalized polymer; and (iii) adding a protic compound to the polymerization system including a functionalized polymer where the ratio of water or protic hydrogen atoms in the protic compound to the lanthanide atoms in the lanthanide-based catalyst is at least 1500 to 1.

22 Claims, 1 Drawing Sheet

(56) References Cited

U.S. PATENT DOCUMENTS

| | | |
|---|---|---|
| 2006/0025539 A1 | 2/2006 | Ozawa et al. |
| 2006/0030677 A1 | 2/2006 | Ozawa et al. |
| 2008/0182954 A1 | 7/2008 | Luo et al. |
| 2009/0043046 A1* | 2/2009 | Luo .................. C08C 19/44 525/54 |
| 2009/0099325 A1* | 4/2009 | Luo .................. B60C 1/00 526/135 |
| 2013/0066016 A1 | 3/2013 | Luo et al. |
| 2014/0011963 A1* | 1/2014 | McCauley ............ C08F 4/12 525/382 |
| 2014/0275403 A1 | 9/2014 | Luo |

FOREIGN PATENT DOCUMENTS

| | | |
|---|---|---|
| JP | 10-306113 A | 11/1998 |
| JP | 11-035633 A | 2/1999 |

\* cited by examiner

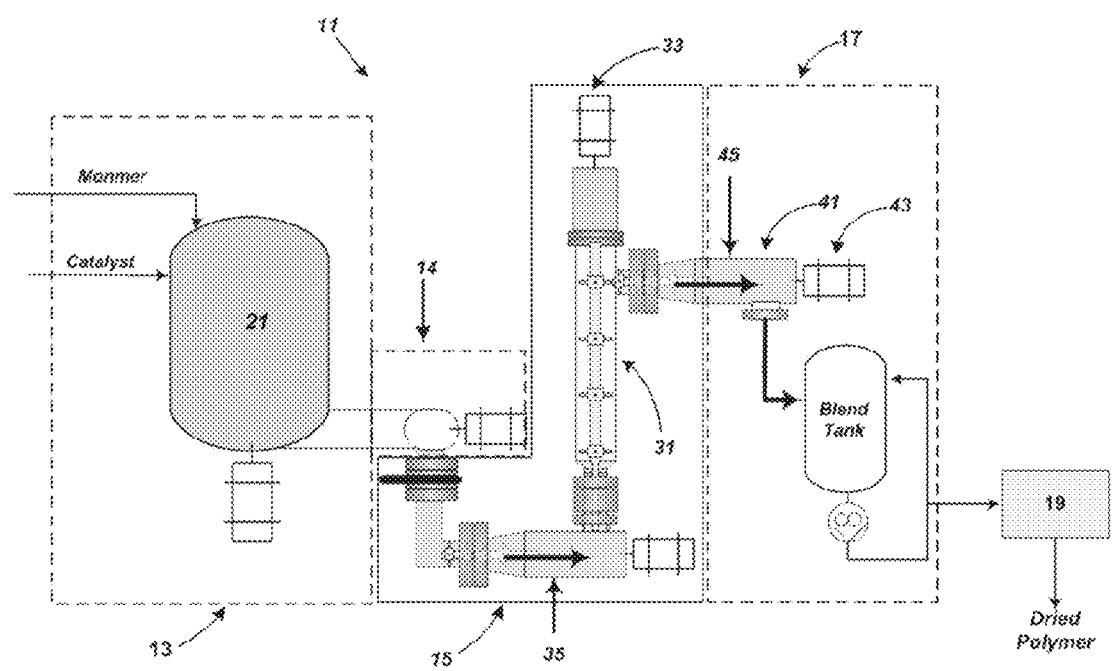

PROCESS FOR PRODUCING FUNCTIONALIZED POLYMERS

This application claims the benefit of U.S. Provisional Application Ser. No. 62/164,171, filed on May 20, 2015, which is incorporated herein by reference.

FIELD OF THE INVENTION

One or more embodiments of the present invention relate to a method for producing polydienes.

BACKGROUND OF THE INVENTION

Polydienes may be produced by solution polymerization, wherein conjugated diene monomer is polymerized in an inert solvent or diluent. The solvent serves to solubilize the reactants and products, to act as a carrier for the reactants and product, to aid in the transfer of the heat of polymerization, and to help in moderating the polymerization rate. The solvent also allows easier stirring and transferring of the polymerization mixture (also called cement), since the viscosity of the cement is decreased by the presence of the solvent. Nevertheless, the presence of solvent presents a number of difficulties. The solvent must be separated from the polymer and then recycled for reuse or otherwise disposed of as waste. The cost of recovering and recycling the solvent adds greatly to the cost of the polymer being produced, and there is always the risk that the recycled solvent after purification may still retain some impurities that will poison the polymerization catalyst. In addition, some solvents such as aromatic hydrocarbons can raise environmental concerns. Further, the purity of the polymer product may be affected if there are difficulties in removing the solvent.

Polydienes may also be produced by bulk polymerization (also called mass polymerization), wherein conjugated diene monomer is polymerized in the absence or substantial absence of any solvent, and, in effect, the monomer itself acts as a diluent. Since bulk polymerization is essentially solventless, there is less contamination risk, and the product separation is simplified. Bulk polymerization offers a number of economic advantages including lower capital cost for new plant capacity, lower energy cost to operate, and fewer people to operate. The solventless feature also provides environmental advantages, with emissions and waste water pollution being reduced.

Despite its many advantages, bulk polymerization requires very careful temperature control, and there is also the need for strong and elaborate stirring equipment since the viscosity of the polymerization mixture can become very high. In the absence of added diluent, the high cement viscosity and exotherm effects can make temperature control very difficult. Consequently, local hot spots may occur, resulting in degradation, gelation, and/or discoloration of the polymer product. In the extreme case, uncontrolled acceleration of the polymerization rate can lead to disastrous "runaway" reactions. To facilitate the temperature control during bulk polymerization, it is desirable that a catalyst gives a reaction rate that is sufficiently fast for economic reasons but is slow enough to allow for the removal of the heat from the polymerization exotherm in order to ensure the process safety.

A technologically useful bulk polymerization process for the production of polydienes is disclosed in U.S. Pat. No. 7,351,776. According to this patent, a multi-stage continuous process is employed wherein polydienes are polymerized within a first step in the substantial absence of an organic solvent or diluent. The polymerization medium is then removed from the reaction vessel and transferred to a second vessel wherein the polymerization reaction is terminated. This termination occurs prior to a significant monomer conversion. Termination may include the addition of a quenching agent, a coupling agent, a functionalized terminator, or a combination thereof. Following termination, the polymerization medium is then devolatilized.

Within the production of polydienes, such as those produced by the bulk polymerization processes described in U.S. Pat. No. 7,351,776, several functionalizing agents and/or coupling agents have been found to be particularly advantageous. For example, U.S. Pat. No. 8,314,189 teaches that functionalized polymers can be prepared by reacting a reactive polymer with a heterocyclic nitrile compound. These reactive polymers can advantageously be prepared using bulk polymerization processes in a lanthanide-based catalyst system. The resultant functionalized polymers exhibit advantageous cold-flow resistance and provide tire components that exhibit advantageously low hysteresis.

In the art of manufacturing tires, it is desirable to employ rubber vulcanizates that demonstrate reduced hysteresis, i.e., less loss of mechanical energy to heat. For example, rubber vulcanizates that show reduced hysteresis are advantageously employed in tire components, such as sidewalls and treads, to yield tires having desirably low rolling resistance. The hysteresis of a rubber vulcanizate is often attributed to the free polymer chain ends within the crosslinked rubber network, as well as the dissociation of filler agglomerates. Functionalized polymers have been employed to reduce hysteresis of rubber vulcanizates. The functional group of the functionalized polymer may reduce the number of free polymer chain ends via interaction with filler particles. Also, the functional group may reduce filler agglomeration, Nevertheless, whether a particular functional group imparted to a polymer can reduce hysteresis is often unpredictable.

SUMMARY OF THE INVENTION

One or more embodiments provides a method for preparing a functionalized polymer, the method comprising the steps of: (i) in a first zone, polymerizing conjugated diene monomer with a lanthanide-based catalyst within a polymerization mixture that includes less than 20% by weight of solvent based on the total weight of the polymerization mixture to produce a reactive polymer, (ii) transferring the reactive polymer to a second zone and adding a heterocyclic nitrile compound to prepare a functionalized polymer; (iii) transferring the functionalized polymer to a third zone adding a quenching agent, where the ratio of water or protic hydrogen atoms in the quenching agent to the lanthanide atoms in the lanthanide-based catalyst is at least 1500 to 1; and (iv) transferring the functionalized polymer to a devolatizer.

Other embodiments provide a method for the production of polydienes, comprising: (a) charging a mixture of one or more monomer, lanthanide-based catalyst system, and less than 20% weight percent organic solvent based on the total weight of the monomer, catalyst and solvent, into a reactor; (b) polymerizing the monomer to a conversion of up to 20% by weight of the monomer to form a mixture of reactive polymer and monomer; (c) removing the mixture of reactive polymer and monomer from the reactor and functionalizing the reactive polymer with a heterocyclic nitrile compound prior to a total monomer conversion of 25% by weight to form a mixture of functionalized polymer and monomer; (d)

quenching the mixture of functionalized polymer and monomer with a quenching agent, where the ratio of water or protic hydrogen atoms in the quenching agent to the lanthanide atoms in the lanthanide-based catalyst is at least 1500 to 1; and (e) recovering the monomer from the mixture of functionalized polymer and monomer.

Other embodiments provide a method for preparing a functionalized polymer, the method comprising the steps of: (i) preparing a bulk polymerization system including a reactive polymer by introducing a lanthanide-based catalyst and a conjugated diene monomer; (ii) adding a heterocyclic nitrile compound the polymerization system including the reactive polymer to prepare polymerization system including a functionalized polymer; and (iii) adding a protic compound to the polymerization system including a functionalized polymer where the ratio of water or protic hydrogen atoms in the protic compound to the lanthanide atoms in the lanthanide-based catalyst is at least 1500 to 1.

DESCRIPTION OF THE DRAWINGS

The FIGURE is a schematic representation of a process according to embodiments of the present invention.

DETAILED DESCRIPTION OF ILLUSTRATIVE EMBODIMENTS

Embodiments of this invention are based, at least in part, on the discovery of a continuous process for producing functionalized polydienes, where the process includes preparing reactive polydienes in the substantial absence of solvent or diluent, subsequently reacting the reactive polydienes with a heterocyclic nitrile compound, quenching the polymerization mixture, and then desolventizing the polymerization mixture. The functionalized polydienes produced by the processes of this invention exhibit advantageous Mooney stability that is believed to result from the manner in which the polymerization is quenched. Thus, while the prior art proposes functionalizing reactive polydienes with heterocyclic nitrile compounds within bulk polymerization processes that include the step of quenching the reactive system prior to devolatilization, it has now been discovered that threshold amounts of quenching agent are required to stabilize the Mooney viscosity of the functionalized polymer. Failure to treat the functionalized polymer with these threshold levels of quenching agent prior to devolatilization results in polymers that exhibit deleterious fluctuation in Mooney viscosity.

Process Overview

As suggested above, the continuous process for synthesizing functionalized polydienes according to the present invention is a multi-step process that includes (i) polymerizing conjugated dienes within a polymerization medium that is substantially devoid of solvent or diluent, (ii) subsequently reacting the reactive polydienes with a heterocyclic nitrile compound, (iii) quenching the polymerization medium, and (iv) desolventizing the polymerization medium after quenching to separate the functionalized polymer from volatile compounds such as unreacted monomer. In one or more embodiments, the process may further include additional steps including, for example, additional drying or polymer fabrication steps following devolatilization. In one or more embodiments, each step of the process occurs within a distinct location of an overall polymerization system. Similar overall processes are known in the art as described in U.S. Pat. No. 7,351,776, which is incorporated herein by reference.

The overall process can be further explained with reference to the FIGURE, which shows polymerization system 11 having a polymerization zone 13, a functionalization zone 15, a quenching zone 17, and a devolatilization zone 19. In an optional embodiment, an inhibitions zone 14 is located between the polymerization zone 13 and the functionalization zone 15.

In a first step, the polymerization of conjugated dienes is carried out in polymerization zone 13, which may include one or more reactors 21. These reactors may include any appropriate vessel or conduit in which a reaction of this nature may take place. In particular embodiments, reactor 21 is a conventional stirred-tank reactor.

Polymerization

In one or more embodiments, the step of polymerizing takes place within a polymerization mixture, which may also be referred to as polymerization medium, formed within reactor 21. In one or more embodiments, the polymerization mixture includes monomer (such as conjugated diene monomer), polymer (both active and inactive polymer), catalyst, catalyst residue, and solvent. Active polymers include polymeric species that are capable of undergoing further polymerization through the addition of monomer. In one or more embodiments, active polymers may include an anion or negative charge at their active terminus. These polymers may include those prepared using a coordination catalyst. In these or other embodiments, the active polymeric species may be referred to as a pseudo-living polymer. Inactive polymers include polymeric species that cannot undergo further polymerization through the addition of monomer.

Examples of conjugated diene monomers include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more of the foregoing diene monomers may be employed.

Catalyst System

The step of polymerizing conjugated dienes takes place in the presence of a lanthanide-based catalyst system. In one or more embodiments, these catalyst systems include (a) a lanthanide-containing compound, (b) an alkylating agent, and (c) a halogen source. In other embodiments, a compound containing a non-coordinating anion or a non-coordinating anion precursor can be employed in lieu of a halogen source. In these or other embodiments, other organometallic compounds and/or Lewis bases can be employed in addition to the ingredients or components set forth above. For example, in one embodiment, a nickel-containing compound can be employed as a molecular weight regulator as disclosed in U.S. Pat. No. 6,699,813, which is incorporated herein by reference.

Lanthanide-containing compounds useful in the present invention are those compounds that include at least one atom of lanthanum, neodymium, cerium, praseodymium, promethium, samarium, europium, gadolinium, terbium, dysprosium, holmium, erbium, thulium, ytterbium, lutetium, and didymium. In one embodiment, these compounds can include neodymium, lanthanum, samarium, or didymium. As used herein, the term "didymium" shall denote a commercial mixture of rare-earth elements obtained from monazite sand. In addition, the lanthanide-containing compounds useful in the present invention can be in the form of elemental lanthanide.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl) phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl) phosphonate, neodymium butyl (2-ethylhexyl)phosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl) phosphinate, neodymium (1-methylheptyl) (2-ethylhexyl) phosphinate, and neodymium (2-ethylhexyl) (p-nonylphenyl) phosphinate.

Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include, but are not limited to, neodymium methylxanthate, neodymium ethylxanthate, neodymium isopropylxanthate, neodymium butylxanthate, and neodymium benzylxanthate.

Suitable neodymium β-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include, but are not limited to, neodymium fluoride, neodymium chloride, neodymium bromide, and neodymium iodide; suitable neodymium pseudo-halides include, but are not limited to, neodymium cyanide, neodymium cyanate, neodymium thiocyanate, neodymium azide, and neodymium ferrocyanide; and suitable neodymium oxyhalides include, but are not limited to, neodymium oxyfluoride, neodymium oxychloride, and neodymium oxybromide. A Lewis base, such as tetrahydrofuran ("THF"), may be employed as an aid for solubilizing these classes of neodymium compounds in inert organic solvents. Where lanthanide halides, lanthanide oxyhalides, or other lanthanide-containing compounds containing a halogen atom are employed, the lanthanide-containing compound may also serve as all or part of the halogen source in the above-mentioned catalyst system.

As used herein, the term organolanthanide compound refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group. In one or more embodiments, hydrocarbyl groups useful in the present invention may contain heteroatoms such as, for example, nitrogen, oxygen, boron, silicon, sulfur, and phosphorus atoms.

As mentioned above, the catalyst systems employed in the present invention can include an alkylating agent. In one or more embodiments, alkylating agents, which may also be referred to as hydrocarbylating agents, include organometallic compounds that can transfer one or more hydrocarbyl groups to another metal. Typically, these agents include organometallic compounds of electropositive metals such as Groups 1, 2, and 3 metals (Groups IA, IIA, and IIIA metals). Alkylating agents useful in the present invention include, but are not limited to, organoaluminum and organomagnesium compounds. As used herein, the term organoaluminum compound refers to any aluminum compound containing at least one aluminum-carbon bond. In one or more embodiments, organoaluminum compounds that are soluble in a hydrocarbon solvent can be employed. As used herein, the term organomagnesium compound refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a halide. Where the alkylating agent includes a halogen atom, the alkylating agent may also serve as all or part of the halogen source in the above-mentioned catalyst system.

In one or more embodiments, organoaluminum compounds that can be utilized include those represented by the general formula $AlR_1X_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. Where the organoaluminum compound includes a halogen atom, the organoaluminum compound can serve as both the alkylating agent and at least a portion of the halogen source in the catalyst system. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_1X_3$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the present invention is aluminoxanes. Aluminoxanes can comprise oligomeric linear aluminoxanes, which can be represented by the general formula:

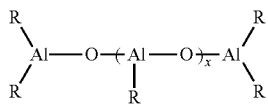

and oligomeric cyclic aluminoxanes, which can be represented by the general formula:

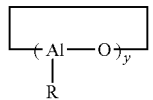

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of mol of the aluminoxane as used in this application refers to the number of mol of the aluminum atoms rather than the number of mol of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be preformed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20 to 80 percent of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Publication No. 2008/0182954, which is incorporated herein by reference in its entirety, provides other examples where aluminoxanes and organoaluminum compounds can be employed in combination.

As mentioned above, alkylating agents useful in the present invention can comprise organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the organomagnesium compound includes a halogen atom, the organomagnesium compound can serve as both the alkylating agent and at least a portion of the halogen source in the catalyst systems. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As mentioned above, the catalyst systems employed in the present invention can include a halogen source. As used herein, the term halogen source refers to any substance including at least one halogen atom. In one or more embodiments, at least a portion of the halogen source can be provided by either of the above-described lanthanide-containing compound and/or the above-described alkylating agent, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source.

In another embodiment, at least a portion of the halogen source can be present in the catalyst systems in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed include, but are not limited to, elemental halogens, mixed halogens, hydrogen halides, organic halides, inorganic halides, metallic halides, and organometallic halides.

Elemental halogens suitable for use in the present invention include, but are not limited to, fluorine, chlorine, bromine, and iodine. Some specific examples of suitable mixed halogens include iodine monochloride, iodine monobromide, iodine trichloride, and iodine pentafluoride.

Hydrogen halides include, but are not limited to, hydrogen fluoride, hydrogen chloride, hydrogen bromide, and hydrogen iodide.

Organic halides include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide (also called α,α-dibromotoluene or benzal bromide), methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, methyl bromoformate, carbon tetrabromide (also called tetrabromomethane), tribromomethane (also called bromoform), bromomethane, dibromomethane, 1-bromopropane, 2-bromopropane, 1,3-dibromopropane, 2,2-dimethyl-1-bromopropane (also called neopentyl bromide), formyl bromide, acetyl bromide, propionyl bromide, butyryl bromide, isobutyryl bromide, valeroyl bromide, isovaleryl bromide, hexanoyl bromide, benzoyl bromide, methyl bromoacetate, methyl 2-bromopropionate, methyl 3-bromopropionate, methyl 2-bromobutyrate, methyl 2-bromohexanoate, methyl 4-bromocrotonate, methyl 2-bromobenzoate, methyl 3-bromobenzoate, methyl 4-bromobenzoate, iodomethane, diiodomethane, triiodomethane (also called iodoform), tetraiodomethane, 1-iodopropane, 2-iodopropane, 1,3-diiodopropane, t-butyl iodide, 2,2-dimethyl-1-iodopropane (also called neopentyl iodide), allyl iodide, iodobenzene, benzyl iodide, diphenylmethyl iodide, triphenylmethyl iodide, benzylidene iodide (also called benzal iodide or α,α-diiodotoluene), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, and methyl iodoformate.

Inorganic halides include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

In one or more embodiments, the above-described catalyst systems can comprise a compound containing a non-coordinating anion or a non-coordinating anion precursor. In one or more embodiments, a compound containing a non-coordinating anion, or a non-coordinating anion precursor can be employed in lieu of the above-described halogen source. A non-coordinating anion is a sterically bulky anion that does not form coordinate bonds with, for example, the active center of a catalyst system due to steric hindrance. Non-coordinating anions useful in the present invention include, but are not limited to, tetraarylborate anions and fluorinated tetraarylborate anions. Compounds containing a non-coordinating anion can also contain a counter cation, such as a carbonium, ammonium, or phosphonium cation. Exemplary counter cations include, but are not limited to, triarylcarbonium cations and N,N-dialkylanilinium cations. Examples of compounds containing a non-coordinating anion and a counter cation include, but are not limited to, triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

A non-coordinating anion precursor can also be used in this embodiment. A non-coordinating anion precursor is a compound that is able to form a non-coordinating anion under reaction conditions. Useful non-coordinating anion precursors include, but are not limited to, triarylboron compounds, $BR_3$, where R is a strong electron-withdrawing aryl group, such as a pentafluorophenyl or 3,5-bis(trifluoromethyl)phenyl group.

In one or more embodiments, the molar ratio of the alkylating agent to the lanthanide-containing compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide-containing compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide-containing compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide-containing compound is best described in terms of the ratio of the mole of halogen atoms in the halogen source to the mole of lanthanide atoms in the lanthanide-containing compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In yet another embodiment, the molar ratio of the non-coordinating anion or non-coordinating anion precursor to the lanthanide-containing compound (An/Ln) may be from about 0.5:1 to about 20:1, in other embodiments from about 0.75:1 to about 10:1, and in other embodiments from about 1:1 to about 6:1.

Catalyst Formation

The active catalyst can be formed by various methods.

In one or more embodiments, the active catalyst may be preformed by using a preforming procedure. That is, the catalyst ingredients are pre-mixed outside the polymerization system either in the absence of any monomer or in the presence of a small amount of at least one conjugated diene monomer at an appropriate temperature, which may be from about −20° C. to about 80° C. The resulting catalyst composition may be referred to as a preformed catalyst. The preformed catalyst may be aged, if desired, prior to being added to the monomer that is to be polymerized. As used herein, reference to a small amount of monomer refers to a catalyst loading of greater than 2 mmol, in other embodiments greater than 3 mmol, and in other embodiments greater than 4 mmol of lanthanide-containing compound per 100 g of monomer during the catalyst formation. In particular embodiments, the preformed catalyst may be prepared by an in-line preforming procedure whereby the catalyst ingredients are introduced into the feed line of reactor 21 wherein they are mixed either in the absence of any monomer or in the presence of a small amount of at least one conjugated diene monomer. The resulting preformed catalyst can be either stored for future use or directly fed to the monomer that is to be polymerized.

In other embodiments, the active catalyst may be formed in situ by adding the catalyst ingredients, in either a stepwise or simultaneous manner, to the monomer to be polymerized. For instance, one or more of the catalyst ingredients may be added at a time via the feed lines of reactor 21 complete with monomer to be polymerized. In one embodiment, the alkylating agent can be added first, followed by the lanthanide-containing compound, and then followed by the halogen source or by the compound containing a non-coordinating anion or the non-coordinating anion precursor. In one or more embodiments, two of the catalyst ingredients can be pre-combined prior to addition to the monomer. For example, the lanthanide-containing compound and the alkylating agent can be pre-combined and added as a single stream to the monomer. Alternatively, the halogen source and the alkylating agent can be pre-combined and added as a single stream to the monomer. An in situ formation of the catalyst may be characterized by a catalyst loading of less than 2 mmol, in other embodiments less than 1 mmol, in other embodiments less than 0.2 mmol, in other embodiments less than 0.1 mmol, in other embodiments less than 0.05 mmol, and in other embodiments less than or equal to 0.006 mmol of lanthanide-containing compound per 100 g of monomer during the catalyst formation.

In one or more embodiments, a solvent may be employed as a carrier to either dissolve or suspend the catalyst and/or catalyst ingredients in order to facilitate the delivery of the same to the polymerization system. In other embodiments, monomer can be used as the carrier. In yet other embodiments, the catalyst ingredients can be introduced in their neat state without any solvent.

In one or more embodiments, suitable solvents include those organic compounds that will not undergo polymerization or incorporation into propagating polymer chains during the polymerization of monomer in the presence of the catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, including hydrocarbon oils that are commonly used to oil-extend polymers. Examples of these oils include paraffinic oils, aromatic oils, naphthenic oils, vegetable oils other than castor oils, and low PCA oils including MES, TDAE, SRAE, heavy naphthenic oils. Since these hydrocarbons are non-volatile, they typically do not require separation and remain incorporated in the polymer.

The production of polymer according to this invention can be accomplished by polymerizing conjugated diene monomer in the presence of a catalytically effective amount of the active catalyst. The introduction of the catalyst, the conjugated diene monomer, and any solvent, if employed, forms a polymerization mixture in which a reactive polymer is formed. The amount of the catalyst to be employed may depend on the interplay of various factors such as the type of catalyst employed, the purity of the ingredients, the polymerization temperature, the polymerization rate and conversion desired, the molecular weight desired, and many other factors. Accordingly, a specific catalyst amount cannot be definitively set forth except to say that catalytically effective amounts of the catalyst may be used.

In one or more embodiments, the amount of the lanthanide-containing compound used can be varied from about 0.001 to about 2 mmol, in other embodiments from about 0.005 to about 1 mmol, and in still other embodiments from about 0.01 to about 0.2 mmol per 100 gram of monomer.

Polymerization Mixture

As indicated above, the step of polymerizing conjugated diene within the first step (e.g. within reactor 21) takes place in the substantial absence (i.e. the polymerization mixture is substantially devoid of) solvent or diluent. Those skilled in the art will appreciate benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, in still other embodiments less than about 5% by weight, and in still other embodiments less than about 3% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

In one or more embodiments, all of the ingredients used for the polymerization can be combined within a single vessel (e.g., a conventional stirred-tank reactor), and all steps of the polymerization can be conducted within this vessel. In other embodiments, two or more of the ingredients can be pre-combined in one vessel and then transferred to another vessel where the polymerization of monomer (or at least a major portion thereof) may be conducted.

In one or more embodiments, the conditions under which the polymerization proceeds (i.e. the conditions within polymerization zone 13) may be controlled to maintain the temperature of the polymerization mixture within a range from about −10° C. to about 200° C., in other embodiments from about 0° C. to about 150° C., and in other embodiments from about 20° C. to about 100° C. In particular embodiments, the polymerization takes place, or at least a portion of the polymerization takes place, at a temperature of a least 0° C., in other embodiments at least 10° C., and in other embodiments at least 20° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

In one or more embodiments, the extent of monomer conversion within polymerization system 11 (and in particular embodiments within reactor 21) is limited. As the skilled person understands, the extent of polymerization can be limited by the residence time within reactor 21. In one or more embodiments, the residence time is manipulated to limit polymerization within reactor 21 (i.e. the extent of monomer conversion) to at most 30%, in other embodiments at most 25%, in other embodiments at most 20%, in other embodiments at most 18%, in other embodiments at most 15%, in other embodiments at most 12%, and in other embodiments at most 10% by weight of total monomer available for polymerization. Thus, for example, where monomer conversion is limited to about 10%, the effluent of polymerization mixture leaving reactor 21 includes about 10% by weight polymer and about 90% by weight unreacted monomer based upon the total weight of the monomer and polymer.

Although it is advantageous to limit the extent of polymerization within reactor 21, it is nonetheless desirable to achieve a minimum polymerization. In one or more embodiments, a monomer conversion of at least 3%, in other embodiments at least 5%, in other embodiments at least 8%, in other embodiments at least 10%, and in other embodiments at least 12% is achieved within reactor 21.

Functionalization

With reference again to the FIGURE, the process of the present invention includes removing the polymerization mixture from polymerization zone 13 (i.e. from reactor 21)

and transferring the polymerization mixture to a functionalization zone 15 where the active polymer is reacted with a heterocyclic nitrile compound. As shown in The FIGURE, functionalization zone 15 includes one or more conduit 31 that may include in-line mixing devices 33. Heterocyclic nitrile compound may be injected into functionalization zone 15 via inlet 35. Within the context of a continuous process, the addition of a heterocyclic nitrile compound occurs downstream of the polymerization step.

In one or more embodiments, the reaction between the active polymer and the heterocyclic nitrile compound substantially terminates further growth of the active polymer (i.e. polymerization of monomer is substantially terminated). It is believed that the heterocyclic group of the heterocyclic nitrile compound coordinates with the lanthanide-based catalyst system to quickly halt the polymerization. Also, the reaction between the active polymer and the heterocyclic nitrile compound imparts a residue of the heterocyclic nitrile compound at the end (i.e. growing terminus) of at least a portion of the polymer chains. As suggested above, some or all of the polymer chains of the polymerization mixture leaving polymerization zone 13 and entering functionalization zone 15 may possess reactive ends. In one or more embodiments, at least about 20% of the polymer chains possess a reactive end, in other embodiments at least about 50% of the polymer chains possess a reactive end, and in still other embodiments at least about 80% of the polymer chains possess a reactive end. In any event, the reactive polymer can be reacted with a heterocyclic nitrile to form a functionalized polymer.

In optional embodiments, the polymerization mixture is removed from the polymerization zone 13 an transferred to inhibition zone 14, where a Lewis base is charged into the polymerization mixture to inhibit further polymer chain growth with maintaining polymer reactivity toward the functionalization agent. In this respect, U.S. Pat. Publ. No. 2009/0043046 is incorporated herein by reference. In these embodiments, once the polymerization mixture and the Lewis base are contacted within the inhibition zone 14, the polymerization mixture is then transferred to functionalization zone 15 as described above.

According to one or more embodiments, a sufficient amount of heterocyclic nitrile compound is injected into functionalization zone 15 to terminate all active polymer chains. The amount of the heterocyclic nitrile compound that can be added to the polymerization mixture may depend on various factors including the type and amount of catalyst or initiator used to initiate the polymerization and the desired degree of functionalization. In one or more embodiments, where the reactive polymer is prepared by employing a lanthanide-based catalyst, the amount of the heterocyclic nitrile compound employed can be described with reference to the lanthanide metal of the lanthanide compound. For example, the molar ratio of the heterocyclic nitrile compound to the lanthanide metal may be from about 1:1 to about 200:1, in other embodiments from about 5:1 to about 150:1, and in other embodiments from about 10:1 to about 100:1.

In one or more embodiments, the amount of heterocyclic nitrile compound, as well as the manner in which the heterocyclic nitrile compound is added to functionalization zone 15, is manipulated to bring about termination of all active polymer chains before a threshold degree of total polymerization (i.e. total monomer conversion) is achieved with functionalization zone 15, where total monomer conversion refers to the monomer conversion taking place with polymerization zone 13 and functionalization zone 15. In one or more embodiments, the total monomer conversion is at most 35%, in other embodiments at most 30%, in other embodiments at most 25%, in other embodiments at most 20%, in other embodiments at most 18%, in other embodiments at most 15%, and in other embodiments at most 12%.

The total monomer conversion may be characterized by a minimum monomer conversion. In one or more embodiments, the total monomer conversion is at least 3%, in other embodiments at least 5%, in other embodiments at least 8%, in other embodiments at least 10%, and in other embodiments at least 12%.

In one or more embodiments, the conditions under which functionalization proceeds (i.e. the conditions within functionalization zone 15) may be controlled to maintain the temperature within a range from about 0° C. to about 80° C., in other embodiments from about 5° C. to about 50° C., and in other embodiments from about 20° C. to about 30° C. In one or more embodiments, the pressures at which the functionalization may be carried out include those that ensure that the majority of the monomer is in the liquid phase. In these or other embodiments, the polymerization mixture may be maintained under anaerobic conditions within functionalization zone 15.

The time required for completing the reaction between the heterocyclic nitrile compound and the reactive polymer depends on various factors such as the type and amount of the catalyst or initiator used to prepare the reactive polymer, the type and amount of the heterocyclic nitrile compound, as well as the temperature at which the functionalization reaction is conducted. In one or more embodiments, the reaction between the heterocyclic nitrile compound and the reactive polymer can be conducted for about 10 to 60 minutes.

Heterocyclic Nitrile Compounds

In one or more embodiments, heterocyclic nitrile compounds include at least one —C≡N group (i.e. cyano or nitrile group) and at least one heterocyclic group. In particular embodiments, at least one cyano group is directly attached to a heterocyclic group. In these or other embodiments, at least one cyano group is indirectly attached to a heterocyclic group.

In one or more embodiments, heterocyclic nitrile compounds may be represented by the formula θ-C≡N, where θ represents a heterocyclic group. In other embodiments, heterocyclic nitrile compounds may be represented by the formula θ-R—C≡N, where θ represents a heterocyclic group and R represents a divalent organic group.

In one or more embodiments, the divalent organic groups of the heterocyclic nitrile compound may be hydrocarbylene groups, which include, but are not limited to, alkylene, cycloalkylene, alkenylene, cycloalkenylene, alkynylene, cycloalkynylene, or arylene groups. Hydrocarbylene groups include substituted hydrocarbylene groups, which refer to hydrocarbylene groups in which one or more hydrogen atoms have been replaced by a substituent such as a hydrocarbyl, hydrocarbyloxy, silyl, or silyloxy group. In one or more embodiments, these groups may include from one, or the appropriate minimum number of carbon atoms to form the group, to about 20 carbon atoms. These groups may also contain one or more heteroatoms such as, but not limited to, nitrogen, oxygen, boron, silicon, sulfur, tin, and phosphorus atoms.

In one or more embodiments, θ may contain one or more additional cyano groups (i.e., —C≡N), and as a result the heterocyclic nitrile compounds may therefore contain two or more cyano groups. In these or other embodiments, the heterocyclic group may contain unsaturation and may be aromatic or non-aromatic. The heterocyclic group may contain one heteroatom or multiple heteroatoms that are either the same or distinct. In particular embodiments, the heteroatoms may be selected from the group consisting of nitrogen, oxygen, sulfur, boron, silicon, tin, and phosphorus atoms. Also, the heterocyclic group may be monocyclic, bicyclic, tricyclic or multicyclic.

In one or more embodiments, the heterocyclic group may be a substituted heterocyclic group, which is a heterocyclic group wherein one or more hydrogen atoms of the heterocyclic ring have been replaced by a substituent such as a monovalent organic group. In one or more embodiments, the monovalent organic groups may include hydrocarbyl groups or substituted hydrocarbyl groups such as, but not limited to, alkyl, cycloalkyl, substituted cycloalkyl, alkenyl cycloalkenyl, substituted cycloalkenyl, aryl, allyl, substituted aryl, aralkyl, alkaryl, or alkynyl groups. In one or more embodiments, these groups may include from one, or the appropriate minimum number of carbon atoms to form the group, to 20 carbon atoms. These hydrocarbyl groups may contain heteroatoms such as, but not limited to, nitrogen, boron, oxygen, silicon, sulfur, and phosphorus atoms.

Representative examples of heterocyclic groups containing one or more nitrogen heteroatoms include 2-pyridyl, 3-pyridyl, 4-pyridyl, pyrazinyl, 2-pyrimidinyl, 4-pyrimidinyl, 5-pyrimidinyl, 3-pyridazinyl, 4-pyridazinyl, N-methyl-2-pyrrolyl, N-methyl-3-pyrrolyl, N-methyl-2-imidazolyl, N-methyl-4-imidazolyl, N-methyl-5-imidazolyl, N-methyl-3-pyrazolyl, N-methyl-4-pyrazolyl, N-methyl-5-pyrazolyl, N-methyl-1,2,3-triazol-4-yl, N-methyl-1,2,3-triazol-5-yl, N-methyl-1,2,4-triazol-3-yl, N-methyl-1,2,4-triazol-5-yl, 1,2,4-triazin-3-yl, 1,2,4-triazin-5-yl, 1,2,4-triazin-6-yl, 1,3,5-triazinyl, N-methyl-2-pyrrolin-2-yl, N-methyl-2-pyrrolin-3-yl, N-methyl-2-pyrrolin-4-yl, N-methyl-2-pyrrolin-5-yl, N-methyl-3-pyrrolin-2-yl, N-methyl-3-pyrrolin-3-yl, N-methyl-2-imidazolin-2-yl, N-methyl-2-imidazolin-4-yl, N-methyl-2-imidazolin-5-yl, N-methyl-2-pyrazolin-3-yl, N-methyl-2-pyrazolin-4-yl, N-methyl-2-pyrazolin-5-yl, 2-quinolyl, 3-quinolyl, 4-quinolyl, 1-isoquinolyl, 3-isoquinolyl, 4-isoquinolyl, N-methylindol-2-yl, N-methylindol-3-yl, N-methylisoindol-1-yl, N-methylisoindol-3-yl, 1-indolizinyl, 2-indolizinyl, 3-indolizinyl, 1-phthalazinyl, 2-quinazolinyl, 4-quinazolinyl, 2-quinoxalinyl, 3-cinnolinyl, 4-cinnolinyl, 1-methylindazol-3-yl, 1,5-naphthyridin-2-yl, 1,5-naphthyridin-3-yl, 1,5-naphthyridin-4-yl, 1,8-naphthyridin-2-yl, 1,8-naphthyridin-3-yl, 1,8-naphthyridin-4-yl, 2-pteridinyl, 4-pteridinyl, 6-pteridinyl, 7-pteridinyl, 1-methylbenzimidazol-2-yl, 6-phenanthridinyl, N-methyl-2-purinyl, N-methyl-6-purinyl, N-methyl-8-purinyl, N-methyl-β-carbolin-1-yl, N-methyl-β-carbolin-3-yl, N-methyl-β-carbolin-4-yl, 9-acridinyl, 1,7-phenanthrolin-2-yl, 1,7-phenanthrolin-3-yl, 1,7-phenanthrolin-4-yl, 1,10-phenanthrolin-2-yl, 1,10-phenanthrolin-3-yl, 1,10-phenanthrolin-4-yl, 4,7-phenanthrolin-1-yl, 4,7-phenanthrolin-2-yl, 4,7-phenanthrolin-3-yl, 1-phenazinyl, 2-phenazinyl, pyrrolidino, and piperidino groups.

Representative examples of heterocyclic groups containing one or more oxygen heteroatoms include 2-furyl, 3-furyl, 2-benzo[b]furyl, 3-benzo[b]furyl, 1-isobenzo[b]furyl, 3-isobenzo[b]furyl, 2-naphtho[2,3-b]furyl, and 3-naphtho[2,3-b]furyl groups.

Representative examples of heterocyclic groups containing one or more sulfur heteroatoms include 2-thienyl, 3-thienyl, 2-benzo[b]thienyl, 3-benzo[b]thienyl, 1-isobenzo[b]thienyl, 3-isobenzo[b]thienyl, 2-naphtho[2,3-b]thienyl, and 3-naphtho[2,3-b]thienyl groups.

Representative examples of heterocyclic groups containing two or more distinct heteroatoms include 2-oxazolyl, 4-oxazolyl, 5-oxazolyl, 3-isoxazolyl, 4-isoxazolyl, 5-isoxazolyl, 2-thiazolyl, 4-thiazolyl, 5-thiazolyl, 3-isothiazolyl, 4-isothiazolyl, 5-isothiazolyl, 1,2,3-oxadiazol-4-yl, 1,2,3-oxadiazol-5-yl, 1,3,4-oxadiazol-2-yl, 1,2,3-thiadiazol-4-yl, 1,2,3-thiadiazol-5-yl, 1,3,4-thiadiazol-2-yl, 2-oxazolin-2-yl, 2-oxazolin-4-yl, 2-oxazolin-5-yl, 3-isoxazolinyl, 4-isoxazolinyl, 5-isoxazolinyl, 2-thiazolin-2-yl, 2-thiazolin-4-yl, 2-thiazolin-5-yl, 3-isothiazolinyl, 4-isothiazolinyl, 5-isothiazolinyl, 2-benzothiazolyl, and morpholino groups.

Representative examples of heterocyclic nitrile compounds defined by the formula θ-C≡N, where θ contains one or more nitrogen heteroatoms, include 2-pyridinecarbonitrile, 3-pyridinecarbonitrile, 4-pyridinecarbonitrile, pyrazinecarbonitrile, 2-pyrimidinecarbonitrile, 4-pyrimidinecarbonitrile, 5-pyrimidinecarbonitrile, 3-pyridazinecarbonitrile, 4-pyridazinecarbonitrile, N-methyl-2-pyrrolecarbonitrile, N-methyl-3-pyrrolecarbonitrile, N-methyl-2-imidazolecarbonitrile, N-methyl-4-imidazolecarbonitrile, N-methyl-5-imidazolecarbonitrile, N-methyl-3-pyrazolecarbonitrile, N-methyl-4-pyrazolecarbonitrile, N-methyl-5-pyrazolecarbonitrile, N-methyl-1,2,3-triazole-4-carbonitrile, N-methyl-1,2,3-triazole-5-carbonitrile, N-methyl-1,2,4-triazole-3-carbonitrile, N-methyl-1,2,4-triazole-5-carbonitrile, 1,2,4-triazine-3-carbonitrile, 1,2,4-triazine-5-carbonitrile, 1,2,4-triazine-6-carbonitrile, 1,3,5-triazinecarbonitrile, N-methyl-2-pyrroline-2-carbonitrile, N-methyl-2-pyrroline-3-carbonitrile, N-methyl-2-pyrroline-4-carbonitrile, N-methyl-2-pyrroline-5-carbonitrile, N-methyl-3-pyrroline-2-carbonitrile, N-methyl-3-pyrroline-3-carbonitrile, N-methyl-2-imidazoline-2-carbonitrile, N-methyl-2-imidazoline-4-carbonitrile, N-methyl-2-imidazoline-5-carbonitrile, N-methyl-2-pyrazoline-3-carbonitrile, N-methyl-2-pyrazoline-4-carbonitrile, N-methyl-2-pyrazoline-5-carbonitrile, 2-quinolinecarbonitrile, 3-quinolinecarbonitrile, 4-quinolinecarbonitrile, 1-isoquinolinecarbonitrile, 3-isoquinolinecarbonitrile, 4-isoquinolinecarbonitrile, N-methylindole-2-carbonitrile, N-methylindole-3-carbonitrile, N-methylisoindole-1-carbonitrile, N-methylisoindole-3-carbonitrile, 1-indolizinecarbonitrile, 2-indolizinecarbonitrile, 3-indolizinecarbonitrile, 1-phthalazinecarbonitrile, 2-quinazolinecarbonitrile, 4-quinazolinecarbonitrile, 2-quinoxalinecarbonitrile, 3-cinnolinecarbonitrile, 4-cinnolinecarbonitrile, 1-methylindazole-3-carbonitrile, 1,5-naphthyridine-2-carbonitrile, 1,5-naphthyridine-3-carbonitrile, 1,5-naphthyridine-4-carbonitrile, 1,8-naphthyridine-2-carbonitrile, 1,8-naphthyridine-3-carbonitrile, 1,8-naphthyridine-4-carbonitrile, 2-pteridinecarbonitrile, 4-pteridinecarbonitrile, 6-pteridinecarbonitrile, 7-pteridinecarbonitrile, 1-methylbenzimidazole-2-carbonitrile, phenanthridine-6-carbonitrile, N-methyl-2-purinecarbonitrile, N-methyl-6-purinecarbonitrile, N-methyl-8-purinecarbonitrile, N-methyl-β-carboline-1-carbonitrile, N-methyl-β-carboline-3-carbonitrile, N-methyl-β-carboline-4-carbonitrile, 9-acridinecarbonitrile, 1,7-phenanthroline-2-carbonitrile, 1,7-phenanthroline-3-carbonitrile, 1,7-phenanthroline-4-carbonitrile, 1,10-phenanthroline-2-carbonitrile, 1,10-phenanthroline-3-carbonitrile, 1,10-phenanthroline-4-carbonitrile, 4,7-phenanthroline-1-carbonitrile, 4,7-phenanthroline-2-carbonitrile, 4,7-phenanthroline-3-carbonitrile, 1-phenazinecarbonitrile, 2-phenazinecarbonitrile, 1-pyrrolidinecarbonitrile, and 1-piperidinecarbonitrile.

Representative examples of heterocyclic nitrile compounds defined by the formula θ-C≡N, where θ contains one or more oxygen heteroatoms, include 2-furonitrile, 3-furonitrile 2-benzo[b]furancarbonitrile, 3-benzo[b]furancarbonitrile, isobenzo[b]furan-1-carbonitrile, isobenzo[b]furan-3-carbonitrile, naphtho[2,3-b]furan-2-carbonitrile, and naphtho[2,3-b]furan-3-carbonitrile.

Representative examples of heterocyclic nitrile compounds defined by the formula θ-C≡N, where θ contains one or more sulfur heteroatoms, include 2-thiophenecarbonitrile, 3-thiophenecarbonitrile, benzo[b]thiophene-2-carbonitrile, benzo[b]thiophene-3-carbonitrile, isobenzo[b]thiophene-1-carbonitrile, isobenzo[b]thiophene-3-carbonitrile, naphtho[2,3-b]thiophene-2-carbonitrile, and naphtho[2,3-b]thiophene-3-carbonitrile.

Representative examples of heterocyclic nitrile compounds defined by the formula θ-C≡N, where θ contains two or more distinct heteroatoms, include 2-oxazolecarbonitrile, 4-oxazolecarbonitrile, 5-oxazolecarbonitrile, 3-isoxazolecarbonitrile, 4-isoxazolecarbonitrile, 5-isoxazolecarbonitrile, 2-thiazolecarbonitrile, 4-thiazolecarbonitrile, 5-thiazolecarbonitrile, 3-isothiazolecarbonitrile, 4-isothiazolecarbonitrile, 5-isothiazolecarbonitrile, 1,2,3-oxadiazole-4-carbonitrile, 1,2,3-oxadiazole-5-carbonitrile, 1,3,4-oxadiazole-2-carbonitrile, 1,2,3-thiadiazole-4-carbonitrile, 1,2,3-thiadiazole-5-carbonitrile, 1,3,4-thiadiazole-2-carbonitrile, 2-oxazoline-2-carbonitrile, 2-oxazoline-4-carbonitrile, 2-oxazoline-5-carbonitrile, 3-isoxazolinecarbonitrile, 4-isoxazolinecarbonitrile, 5-isoxazolinecarbonitrile, 2-thiazoline-2-carbonitrile, 2-thiazoline-4-carbonitrile, 2-thiazoline-5-carbonitrile, 3-isothiazolinecarbonitrile, 4-isothiazolinecarbonitrile, 5-isothiazolinecarbonitrile, benzothiazole-2-carbonitrile, and 4-morpholinecarbonitrile.

Representative examples of heterocyclic nitrile compounds defined by the formula θ-C≡N, where θ contains one or more cyano groups include 2,3-pyridinedicarbonitrile, 2,4-pyridinedicarbonitrile, 2,5-pyridinedicarbonitrile, 2,6-pyridinedicarbonitrile, 3,4-pyridinedicarbonitrile, 2,4-pyrimidinedicarbonitrile, 2,5-pyrimidinedicarbonitrile, 4,5-pyrimidinedicarbonitrile, 4,6-pyrimidinedicarbonitrile, 2,3-pyrazinedicarbonitrile, 2,5-pyrazinedicarbonitrile, 2,6-pyrazinedicarbonitrile, 2,3-furandicarbonitrile, 2,4-furandicarbonitrile, 2,5-furandicarbonitrile, 2,3-thiophenedicarbonitrile, 2,4-thiophenedicarbonitrile, 2,5-thiophenedicarbonitrile, N-methyl-2,3-pyrroledicarbonitrile, N-methyl-2,4-pyrroledicarbonitrile, N-methyl-2,5-pyrroledicarbonitrile, 1,3,5-triazine-2,4-dicarbonitrile, 1,2,4-triazine-3,5-dicarbonitrile, 1,2,4-triazine-3,6-dicarbonitrile, 2,3,4-pyridinetricarbonitrile, 2,3,5-pyridinetricarbonitrile, 2,3,6-pyridinetricarbonitrile, 2,4,5-pyridinetricarbonitrile, 2,4,6-pyridinetricarbonitrile, 3,4,5-pyridinetricarbonitrile, 2,4,5-pyrimidinetricarbonitrile, 2,4,6-pyrimidinetricarbonitrile, 4,5,6-pyrimidinetricarbonitrile, pyrazinetricarbonitrile, 2,3,4-furantricarbonitrile, 2,3,5-furantricarbonitrile, 2,3,4-thiophenetricarbonitrile, 2,3,5-thiophenetricarbonitrile, N-methyl-2,3,4-pyrroletricarbonitrile, N-methyl-2,3,5-pyrroletricarbonitrile, 1,3,5-triazine-2,4,6-tricarbonitrile, and 1,2,4-triazine-3,5,6-tricarbonitrile.

Representative examples of heterocyclic nitrile compounds defined by the formula θ-R—C≡N, where θ contains one or more nitrogen heteroatoms, include 2-pyridylacetonitrile, 3-pyridylacetonitrile, 4-pyridylacetonitrile, pyrazinylacetonitrile, 2-pyrimidinylacetonitrile, 4-pyrimidinylacetonitrile, 5-pyrimidinylacetonitrile, 3-pyridazinylacetonitrile, 4-pyridazinylacetonitrile, N-methyl-2-pyrrolylacetonitrile, N-methyl-3-pyrrolylacetonitrile, N-methyl-2-imidazolylacetonitrile, N-methyl-4-imidazolylacetonitrile, N-methyl-5-imidazolylacetonitrile, N-methyl-3-pyrazolylacetonitrile, N-methyl-4-pyrazolylacetonitrile, N-methyl-5-pyrazolylacetonitrile, 1,3,5-triazinylacetonitrile, 2-quinolylacetonitrile, 3-quinolylacetonitrile, 4-quinolylacetonitrile, 1-isoquinolylacetonitrile, 3-isoquinolylacetonitrile, 4-isoquinolylacetonitrile, 1-indolizinylacetonitrile, 2-indolizinylacetonitrile, 3-indolizinylacetonitrile, 1-phthalazinylacetonitrile, 2-quinazolinylacetonitrile, 4-quinazolinylacetonitrile, 2-quinoxalinylacetonitrile, 3-cinnolinylacetonitrile, 4-cinnolinylacetonitrile, 2-pteridinylacetonitrile, 4-pteridinylacetonitrile, 6-pteridinylacetonitrile, 7-pteridinylacetonitrile, 6-phenanthridinylacetonitrile, N-methyl-2-purinylacetonitrile, N-methyl-6-purinylacetonitrile, N-methyl-8-purinylacetonitrile, 9-acridinylacetonitrile, 1,7-phenanthrolin-2-ylacetonitrile, 1,7-phenanthrolin-3-ylacetonitrile, 1,7-phenanthrolin-4-ylacetonitrile, 1,10-phenanthrolin-2-ylacetonitrile, 1,10-phenanthrolin-3-ylacetonitrile, 1,10-phenanthrolin-4-ylacetonitrile, 4,7-phenanthrolin-1-ylacetonitrile, 4,7-phenanthrolin-2-ylacetonitrile, 4,7-phenanthrolin-3-ylacetonitrile, 1-phenazinylacetonitrile, 2-phenazinylacetonitrile, pyrrolidinoacetonitrile, and piperidinoacetonitrile.

Representative examples of heterocyclic nitrile compounds defined by the formula θ-R—C≡N, where θ contains one or more oxygen heteroatoms, include 2-furylacetonitrile, 3-furylacetonitrile, 2-benzo[b]furylacetonitrile, 3-benzo[b]furylacetonitrile, 1-isobenzo[b]furylacetonitrile, 3-isobenzo[b]furylacetonitrile, 2-naphtho[2,3-b]furylacetonitrile, and 3-naphtho[2,3-b]furylacetonitrile.

Representative examples of heterocyclic nitrile compounds defined by the formula θ-R—C≡N, where θ contains one or more sulfur heteroatoms, include 2-thienylacetonitrile, 3-thienylacetonitrile, 2-benzo[b]thienylacetonitrile, 3-benzo[b]thienylacetonitrile, 1-isobenzo[b]thienylacetonitrile, 3-isobenzo[b]thienylacetonitrile, 2-naphtho[2,3-b]thienylacetonitrile, and 3-naphtho[2,3-b]thienylacetonitrile.

Representative examples of heterocyclic nitrile compounds defined by the formula θ—R—C≡N, where θ contains two or more distinct heteroatoms, include 2-oxazolylacetonitrile, 4-oxazolylacetonitrile, 5-oxazolylacetonitrile, 3-isoxazolylacetonitrile, 4-isoxazolylacetonitrile, 5-isoxazolylacetonitrile, 2-thiazolylacetonitrile, 4-thiazolylacetonitrile, 5-thiazolylacetonitrile, 3-isothiazolylacetonitrile, 4-isothiazolylacetonitrile, 5-isothiazolylacetonitrile, 3-isoxazolinylacetonitrile, 4-isoxazolinylacetonitrile, 5-isoxazolinylacetonitrile, 3-isothiazolinylacetonitrile, 4-isothiazolinylacetonitrile, 5-isothiazolinylacetonitrile, 2-benzothiazolylacetonitrile, and morpholinoacetonitrile.

Representative examples of heterocyclic nitrile compounds defined by the formula θ—R—C≡N, where θ contains one or more cyano groups, include 2,3-pyridinediacetonitrile, 2,4-pyridinediacetonitrile, 2,5-pyridinediacetonitrile, 2,6-pyridinediacetonitrile, 3,4-pyridinediacetonitrile, 2,4-pyrimidinediacetonitrile, 2,5-pyrimidinediacetonitrile, 4,5-pyrimidinediacetonitrile, 4,6-pyrimidinediacetonitrile, 2,3-pyrazinediacetonitrile, 2,5-pyrazinediacetonitrile, 2,6-pyrazinediacetonitrile, 2,3-furandiacetonitrile, 2,4-furandiacetonitrile, 2,5-furandiacetonitrile, 2,3-thiophenediacetonitrile, 2,4-thiophenediacetonitrile, 2,5-thiophenediacetonitrile, N-methyl-2,3-pyrrolediacetonitrile, N-methyl-2,4-pyrrolediacetonitrile, N-methyl-2,5-pyrrolediacetonitrile, 1,3,5-triazine-2,4-diacetonitrile, 1,2,4-triazine-3,5-diacetonitrile, 1,2,4-triazine-3,6-diacetonitrile, 2,3,4-pyridinetriacetonitrile, 2,3,5-pyridinetriacetonitrile, 2,3,6-pyridinetriacetonitrile, 2,4,5-pyridinetriacetonitrile, 2,4,6-pyridinetriacetonitrile, 3,4,5-pyridinetriacetonitrile, 2,4,5-pyrimidinetriacetonitrile, 2,4,6-pyrimidinetriacetonitrile, 4,5,6-pyrimidinetriacetonitrile, pyrazinetriacetonitrile, 2,3,4-furantriacetonitrile, 2,3,5-furantriacetonitrile, 2,3,4-thiophenetriacetonitrile, 2,3,5-thiophenetriacetonitrile, N-methyl-2,3,4-pyrroletriacetonitrile, N-methyl-2,3,5-pyrroletriacetonitrile, 1,3,5-triazine-2,4,6-triacetonitrile, and 1,2,4-triazine-3,5,6-triacetonitrile.

Co-Functionalizing Agent

In one or more embodiments, in addition to the heterocyclic nitrile compound, a co-functionalizing agent may also be added to the polymerization mixture to yield a functionalized polymer with tailored properties. A mixture of two or more co-functionalizing agents may also be employed. The co-functionalizing agent may be added to the polymerization mixture prior to, together with, or after the introduction of the heterocyclic nitrile compound. In one or more embodiments, the co-functionalizing agent is added to the polymerization mixture at least 5 minutes after, in other embodiments at least 10 minutes after, and in other embodiments at least 30 minutes after the introduction of the heterocyclic nitrile compound.

In one or more embodiments, co-functionalizing agents include compounds or reagents that can react with a reactive polymer produced by this invention and thereby provide the polymer with a functional group that is distinct from a propagating chain that has not been reacted with the co-functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the co-functionalizing agent and the reactive polymer proceeds via an addition or substitution reaction.

Useful co-functionalizing agents may include compounds that simply provide a functional group at the end of a polymer chain without joining two or more polymer chains together, as well as compounds that can couple or join two or more polymer chains together via a functional linkage to form a single macromolecule. The latter type of co-functionalizing agents may also be referred to as coupling agents.

In one or more embodiments, co-functionalizing agents include compounds that will add or impart a heteroatom to the polymer chain. In particular embodiments, co-functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable co-functionalizing agents include those compounds that contain groups that may react with the reactive polymers produced in accordance with this invention. Exemplary co-functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of co-functionalizing agents include azine compounds as described in U.S. Pat. No. 7,879,952, hydrobenzamide compounds as disclosed in U.S. Pat. No. 7,671,138, nitro compounds as disclosed in U.S. Pat. No. 7,732,534, and protected oxime compounds as disclosed in U.S. Pat. No. 8,088,868, all of which are incorporated herein by reference.

In particular embodiments, the co-functionalizing agents employed may be metal halides, metalloid halides, alkoxysilanes, metal carboxylates, hydrocarbylmetal carboxylates, hydrocarbylmetal ester-carboxylates, and metal alkoxides.

Exemplary metal halide compounds include tin tetrachloride, tin tetrabromide, tin tetraiodide, n-butyltin trichloride, phenyltin trichloride, di-n-butyltin dichloride, diphenyltin dichloride, tri-n-butyltin chloride, triphenyltin chloride, germanium tetrachloride, germanium tetrabromide, germanium tetraiodide, n-butylgermanium trichloride, di-n-butylgermanium dichloride, and tri-n-butylgermanium chloride.

Exemplary metalloid halide compounds include silicon tetrachloride, silicon tetrabromide, silicon tetraiodide, methyltrichlorosilane, phenyltrichlorosilane, dimethyldichlorosilane, diphenyldichlorosilane, boron trichloride, boron tribromide, boron triiodide, phosphorous trichloride, phosphorous tribromide, and phosphorus triiodide.

In one or more embodiments, the alkoxysilanes may include at least one group selected from the group consisting of an epoxy group and an isocyanate group.

Exemplary alkoxysilane compounds including an epoxy group include (3-glycidyloxypropyl)trimethoxysilane, (3-glycidyloxypropyl)triethoxysilane, (3-glycidyloxypropyl)triphenoxysilane, (3-glycidyloxypropyl)methyldimethoxysilane, (3-glycidyloxypropyl)methyldiethoxysilane, (3-glycidyloxypropyl)methyldiphenoxysilane, [2-(3,4-epoxycyclohexyl)ethyl]trimethoxysilane, and [2-(3,4-epoxycyclohexyl)ethyl]triethoxysilane.

Exemplary alkoxysilane compounds including an isocyanate group include (3-isocyanatopropyl)trimethoxysilane, (3-isocyanatopropyl)triethoxysilane, (3-isocyanatopropyl)triphenoxysilane, (3-isocyanatopropyl)methyldimethoxysilane, (3-isocyanatopropyl)methyldiethoxysilane (3-isocyanatopropyl)methyldiphenoxysilane, and (isocyanatomethyl)methyldimethoxysilane.

Exemplary metal carboxylate compounds include tin tetraacetate, tin bis(2-ethylhexanoate), and tin bis(neodecanoate).

Exemplary hydrocarbylmetal carboxylate compounds include triphenyltin 2-ethylhexanoate, tri-n-butyltin 2-ethylhexanoate, tri-n-butyltin neodecanoate, triisobutyltin 2-ethylhexanoate, diphenyltin bis(2-ethylhexanoate), di-n-butyltin bis(2-ethylhexanoate), di-n-butyltin bis(neodecanoate), phenyltin tris(2-ethylhexanoate), and n-butyltin tris(2-ethylhexanoate).

Exemplary hydrocarbylmetal ester-carboxylate compounds include di-n-butyltin bis(n-octylmaleate), di-n-octyltin bis(n-octylmaleate), diphenyltin bis(n-octylmaleate), di-n-butyltin bis(2-ethylhexylmaleate), di-n-octyltin bis(2-ethylhexylmaleate), and diphenyltin bis(2-ethylhexylmaleate).

Exemplary metal alkoxide compounds include dimethoxytin, diethoxytin, tetraethoxytin, tetra-n-propoxytin, tetraisopropoxytin, tetra-n-butoxytin, tetraisobutoxytin, tetra-t-butoxytin, and tetraphenoxytin.

The amount of the co-functionalizing agent that can be added to the polymerization mixture may depend on various factors including the type and amount of catalyst or initiator used to synthesize the reactive polymer and the desired degree of functionalization. In one or more embodiments, where the reactive polymer is prepared by employing a lanthanide-based catalyst, the amount of the co-functionalizing agent employed can be described with reference to the lanthanide metal of the lanthanide-containing compound.

For example, the molar ratio of the co-functionalizing agent to the lanthanide metal may be from about 1:1 to about 200:1, in other embodiments from about 5:1 to about 150:1, and in other embodiments from about 10:1 to about 100:1.

The amount of the co-functionalizing agent employed can also be described with reference to the heterocyclic nitrile compound. In one or more embodiments, the molar ratio of the co-functionalizing agent to the heterocyclic nitrile compound may be from about 0.05:1 to about 1:1, in other embodiments from about 0.1:1 to about 0.8:1, and in other embodiments from about 0.2:1 to about 0.6:1.

Quenching

As indicated above, after the reaction between the reactive polymer and the heterocyclic nitrile compound (and optionally the co-functionalizing agent) has been accomplished or completed, the polymerization mixture is quenched. With reference again to The FIGURE, the polymerization mixture is transferred from functionalization zone 15 to quenching zone 17, where a quenching agent is added to the polymerization mixture. As shown, quenching zone 17 may include one or more conduit 41 that may include in-line mixing devices 43. Quenching agent may be injected into functionalization zone 15 via inlet 45. Within the context of a continuous process, the addition of a quenching agent occurs downstream of the functionalization step. While further polymerization (i.e. monomer conversion) is terminated with the addition of the heterocyclic nitrile compound within the functionalization step, quenching of the system is performed in order to prevent the aluminum-alkyl complexes from having an appreciable impact on the polymer product. Additionally, and in accordance with practice of the present invention, it has been discovered that the addition of threshold amounts of quenching agent yields a functionalized polymer having a stabilized Mooney viscosity.

The quenching agent may include a protic compound, which is a compound that includes at least one labile hydrogen atom that may be readily donated to protonate the reaction product between the reactive polymer and the heterocyclic nitrile compound, inactivate any residual reactive polymer chains, and/or inactivate the catalyst or catalyst components. Suitable quenching agents include, but are not limited to, alcohols, carboxylic acids, an inorganic acids, water, and mixtures thereof. Exemplary alcohols include methanol, ethanol, n-propyl alcohol, isopropyl alcohol, n-butyl alcohol, and t-butyl alcohol. Exemplary carboxylic acids include acetic acid, propionic acid, butyric acid, valeric acid, and octanoic acid. Exemplary inorganic acids include hydrochloric acid, nitric acid, phosphoric acid, sulfuric acid, boric acid, hydrofluoric acid, hydrobromic acid, and perchloric acid.

As suggested above, threshold amounts of quenching agent may be added to the polymerization mixture, which amounts are sufficient to produce a stable Mooney viscosity in a functionalized polymer. In one or more embodiments, the amount of quenching agent added may be described with reference to the lanthanide metal of the lanthanide compound. For example, when the quenching agent is water, the molar ratio of water to the lanthanide metal may be at least 1500:1, in other embodiments at least 1700:1, and in other embodiments at least 1900:1. In one or more embodiments, the molar ratio of water to the lanthanide metal may be from about 1500:1 to about 3000:1, in other embodiments from about 1700:1 to about 2500:1, and in other embodiments from about 1900:1 to about 2000:1. In other embodiments, where the quenching agent is an alcohol, carboxylic acid, or an inorganic acid, the molar ratio of the protic hydrogen atoms in the quenching agent to the lanthanide metal may be at least 1500:1, in other embodiments at least 1700:1, and in other embodiments at least 1900:1. In one or more embodiments, the molar ratio of protic hydrogen atoms in the quenching agent to the lanthanide metal may be from about 1500:1 to about 3000:1, in other embodiments from about 1700:1 to about 2500:1, and in other embodiments from about 1900:1 to about 2000:1.

In one or more embodiments, the quenching agent may be added in a vessel that allows for the rapid incorporation of the quenching agent into the polymerization mixture. Incorporation of the quenching agent into the polymerization mixture refers to a uniform distribution of the quenching agent in the polymerization mixture. The speed at which the quenching agent is incorporated into the polymerization mixture may be determined by many factors, including solubility and concentration of the components, viscosity of the solution, and agitation speed of the mixer. In one or more embodiments, the quenching agent may be incorporated into the polymerization mixture using a high shear mixture.

In one or more embodiments, an antioxidant may be added within quenching zone 17. Useful antioxidants include those known in the art such as 2,6-di-tert-butyl-4-methylphenol. In one or more embodiments, the amount of the antioxidant employed may be from about 0.2% to about 1% by weight of the polymer product. The antioxidant can be added as a neat material or, if necessary, dissolved in a solvent or monomer prior to being added to the polymerization mixture.

Devolatilization

As indicated above, after quenching has been accomplished or completed, the polymerization mixture is devolatilized. With reference again to The FIGURE, the polymerization mixture is transferred from quenching zone 17 to devolatilization zone 19, where volatile compounds, such as unreacted monomer, are removed from the polymerization mixture. Within the context of a continuous process, devolatilization occurs downstream of the quenching step.

In one or more embodiments, the devolatilization zone may include a devolatilization reactor including, but not limited to, a screw or paddle apparatus that can be heated or cooled by an external heating jacket. Screw-driving devices are known in the art such as single and twin screw extruders. Alternatively, devolatilizers can include extruder-like apparatus that include a shaft having paddles attached thereto. These extruder-like apparatus can include a single shaft or multiple shafts. The shaft can be axial to the length of the apparatus and the flow of polymer or polymerization medium. The polymer or polymerization medium may be forced through the apparatus by using a pump, and the shaft rotates thereby allowing the paddles to agitate the polymer or polymerization medium and thereby assist in the evolution of unreacted monomer. The paddles can be angled so as to assist movement of the polymerization medium through the devolatilizer, although movement of the polymerization medium through the devolatilizer can be facilitated by the pump that can direct the polymerization medium into the devolatilizer and may optionally be further assisted by an extruder that may optionally be attached in series or at the end of the devolatilizer (i.e., the extruder helps pull the polymerization medium through the devolatilizer). Devolatilizers can further include backmixing vessels. In general, these backmixing vessels include a single shaft that includes a blade that can be employed to vigorously mix and masticate the polymerization medium.

In one or more embodiments, combinations of the various devolatilizing equipment can be employed to achieve desired results. These combinations can also include the use of extruders. In one example, a single shaft "extruder-like" devolatilizer (e.g., one including paddles) can be employed in conjunction with a twin screw extruder. In this example, the polymerization medium first enters the "extruder-like" devolatilizer followed by the twin screw extruder. The twin screw extruder advantageously assists in pulling the polymerization medium through the devolatilizer. The paddles of the devolatilizer can be adjusted to meet conveyance needs.

In one or more embodiments, a twin shaft "extruder-like" devolatilizer can be employed. In certain embodiments, the paddles on each shaft may be aligned so as to mesh with one another as they rotate. The rotation of the shafts can occur in the same direction or in opposite directions.

In one or more embodiments, a backmixing volatilizing vessel can be followed by a twin screw extruder, which can then be followed by a twin shaft extruder-like devolatilizing vessel, which can then be following by a twin screw extruder.

Devolatilizing equipment is known in the art and commercially available. For example, devolatilizing equipment can be obtained from LIST (Switzerland); Coperion Werner & Phleiderer; or NFM Welding Engineers, Inc. (Ohio). Exemplary equipment available from LIST include DISCOTHERM™ B, which is a single shaft "extruder-like" devolatilizer including various mixing/kneading bars or paddles; CRP™, which is a dual shaft "extruder-like" devolatilizer wherein each shaft correlates with the other; ORP™, which is a dual shaft devolatilizer wherein each shaft rotates in an opposite direction to the other.

As those skilled in the art will recognize, devolatilization at a lower pressure may improve the ability to remove unreacted monomer and unwanted byproducts from the polymerization mixture. However, the specific processing equipment used may dictate that higher pressures be used during devolatilization. Thus, the pressure used my be tailored to meet the requirements of the equipment.

In one or more embodiments, the devolatilizers are attached to a monomer recovery system. In other words, as monomer is separated from the polymer product, the monomer can be directed to a cooling or evaporation system. The monomer that is recovered can optionally be returned as a raw material to the polymerization mixture.

Further Processing & Fabrication

In one or more embodiments, functionalized polymer recovered from devolatilization may be further processed as is known in the art. For example, the polymer product can be further dried by, for example, exposing the polymer to heat within a hot air tunnel.

Polymer Product

In one or more embodiments, the polymers prepared according to this invention may contain unsaturation. In these or other embodiments, the polymers are vulcanizable. In one or more embodiments, the polymers can have a glass transition temperature ($T_g$) that is less than 0° C., in other embodiments less than −20° C., and in other embodiments less than −30° C. In one embodiment, these polymers may exhibit a single glass transition temperature. In particular embodiments, the polymers may be hydrogenated or partially hydrogenated.

In one or more embodiments, the polymers of this invention may be cis-1,4-polydienes having a cis-1,4-linkage content that is greater than 97%, in other embodiments greater than 98%, in other embodiments greater than 98.5%, in other embodiments greater than 99.0%, in other embodiments greater than 99.1% and in other embodiments greater than 99.2%, where the percentages are based upon the number of diene mer units adopting the cis-1,4-linkage versus the total number of diene mer units. Also, these polymers may have a 1,2-linkage content that is less than about 2%, in other embodiments less than 1.5%, in other embodiments less than 1%, and in other embodiments less than 0.5%, where the percentages are based upon the number of diene mer units adopting the 1,2-linkage versus the total number of diene mer units. The balance of the diene mer units may adopt the trans-1,4-linkage. The cis-1,4-, 1,2-, and trans-1,4-linkage contents can be determined by infrared spectroscopy.

In one or more embodiments, the number average molecular weight ($M_n$) of these polymers may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question.

In one or more embodiments, the molecular weight distribution or polydispersity ($M_w/M_n$) of these polymers may be less than 5.0, in other embodiments less than 3.0, in other embodiments less than 2.5, in other embodiments less than 2.2, in other embodiments less than 2.1, in other embodiments less than 2.0, in other embodiments less than 1.8, and in other embodiments less than 1.5.

In one or more embodiments, the polymer prepared according the present invention is characterized by a stable Mooney viscosity (ML1+4). The Mooney viscosity of the functionalized polymer may be determined using a Mooney viscometer, such as a Monsanto Mooney viscometer, with a larger rotor. Measurements may be determined at a temperature of 100° C., using a four-minute run time and a one-minute warm-up time. In one or more embodiments, the stable Mooney viscosity of the functionalized polymer of this invention is characterized by a decrease in Mooney viscosity after 24 hours aging under atmospheric conditions of less than 20%, in other embodiments less than 10%, and in other embodiments less than 5%.

INDUSTRIAL APPLICABILITY

The polymers of this invention are particularly useful in preparing rubber compositions that can be used to manufacture tire components. Rubber compounding techniques and the additives employed therein are generally disclosed in *The Compounding and Vulcanization of Rubber*, in *Rubber Technology* ($2^{nd}$ Ed. 1973).

The rubber compositions can be prepared by using the polymers of this invention alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomers, the copolymerization of conjugated diene monomers with other monomers such as vinyl-substituted aromatic monomers, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAS) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

The pH's of the silicas are generally from about 5 to about 7 or slightly over 7, or in embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the polymer and silica in the substantial absence of coupling agents and shielding agents.

The rubber compositions prepared from the polymers of this invention are particularly useful for forming tire components such as treads, subtreads, sidewalls, body ply skims, bead filler, and the like. In one or more embodiments, these tread or sidewall formulations may include from about 10% to about 100% by weight, in other embodiments from about 35% to about 90% by weight, and in other embodiments from about 50% to about 80% by weight of the polymer of this invention based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

Various modifications and alterations that do not depart from the scope and spirit of this invention will become apparent to those skilled in the art. This invention is not to be duly limited to the illustrative embodiments set forth herein.

What is claimed is:

1. A continuous method for preparing a functionalized polymer, the method comprising the steps of:
   (i) in a first zone, continuously polymerizing conjugated diene monomer with a lanthanide-based catalyst within a polymerization mixture that includes less than 20% by weight of solvent based on the total weight of the polymerization mixture to produce a reactive polymer,
   (ii) continuously transferring the reactive polymer to a second zone and adding a heterocyclic nitrile compound to prepare a functionalized polymer;
   (iii) continuously transferring the functionalized polymer to a third zone and adding a quenching agent, where the ratio of water or protic hydrogen atoms in the quenching agent to the lanthanide atoms in the lanthanide-based catalyst is from about 1500 to 1 to about 3000:1; and
   (iv) continuously transferring the functionalized polymer to a devolatizer.

2. The method of claim 1, where the quenching agent is selected from the group consisting of alcohols, carboxylic acids, inorganic acids, water, and mixtures thereof.

3. The method of claim 2, where the quenching agent is an alcohol.

4. The method of claim 2, where the quenching agent is a carboxylic acid.

5. The method of claim 2, where the quenching agent is water.

6. The method of claim 2, where the quenching agent is an inorganic acid.

7. The method of claim 1, where the ratio of water or protic hydrogen atoms in the quenching agent to the lanthanide atoms in the lanthanide-based catalyst is at least 1900 to 1.

8. The method of claim 1, where the polymerization mixture includes less than 5% by weight of solvent based on the total weight of the polymerization mixture.

9. The method of claim 1, where the heterocyclic nitrile compound is defined by the formula θ-C≡N or θ-R—C≡N, where θ is a heterocyclic group and R is a divalent organic group.

10. The method of claim 9, where the heterocyclic group is aromatic.

11. The method of claim 10, where the heterocyclic group is pyridine.

12. The method of claim 1, where the lanthanide-based catalyst includes (a) a lanthanide-containing compound, (b) an alkylating agent, and (c) a halogen source.

13. The method of claim 12, where the alkylating agent includes an aluminoxane and an organoaluminum compound represented by the formula $AlR_nX_{3-n}$, where each R, which may be the same or different, is a monovalent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3.

14. A continuous method for the production of functionalized polydienes, comprising:
   (i) continuously charging a mixture of one or more conjugated diene monomer, lanthanide-based catalyst system, and less than 20% weight percent organic solvent based on the total weight of the monomer, catalyst and solvent, into a reactor;
   (ii) continuously polymerizing the monomer to a conversion of up to 20% by weight of the monomer to form a mixture of reactive polymer and monomer;
   (iii) continuously removing the mixture of reactive polymer and monomer from the reactor and functionalizing the reactive polymer with a heterocyclic nitrile compound prior to a total monomer conversion of 25% by weight to form a mixture of functionalized polymer and monomer;
   (iv) continuously quenching the mixture of functionalized polymer and monomer with a quenching agent, where the ratio of water or protic hydrogen atoms in the quenching agent to the lanthanide atoms in the lanthanide-based catalyst is from about 1500 to 1 to about 3000:1; and
   (v) continuously recovering the monomer from the mixture of functionalized polymer and monomer.

15. The method of claim 14, where the ratio of water or protic hydrogen atoms in the quenching agent to the lanthanide atoms in the lanthanide-based catalyst is at least 1900 to 1.

16. The method of claim 14, where the polymerization mixture includes less than 5% by weight of solvent based on the total weight of the polymerization mixture.

17. The method of claim 14, where the heterocyclic nitrile compound is defined by the formula θ-C≡N or θ-R—C≡N, where θ is a heterocyclic group and R is a divalent organic group.

18. The method of claim 14, where the step of functionalizing the reactive polymer with a heterocyclic nitrile compound and the step of quenching the mixture of functionalized polymer and monomer take place in separate zones.

19. The method of claim 1, where the functionalized polymer is characterized by a decrease in Mooney viscosity ($ML_{1+4}$ @100° C.) after 24 hours aging under atmospheric conditions of less than 10%.

20. The method of claim 14, where the functionalized polydiene is characterized by a decrease in Mooney viscosity ($ML_{1+4}$ @100° C.) after 24 hours aging under atmospheric conditions of less than 10%.

21. The method of claim 1, further comprising the step of adding an antioxidant to the third zone, wherein the amount of antioxidant added is from about 0.2% to about 1% by weight of the functionalized polymer.

22. The method of claim 14, in conjunction with said step of continuously quenching the mixture, introducing an antioxidant to the functionalized polymer, wherein the amount of antioxidant added is from about 0.2% to about 1% by weight of the functionalized polydiene.

* * * * *